Jan. 17, 1928.　　　　　　　　　　　　　　　　　　　　1,656,513
C. E. EMMONS
TESTING DEVICE
Filed Oct. 11, 1924
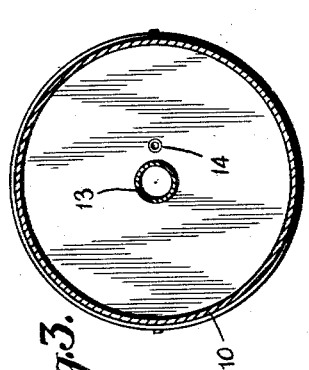
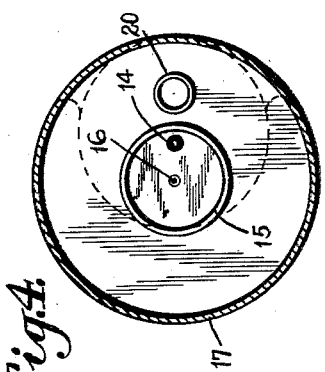
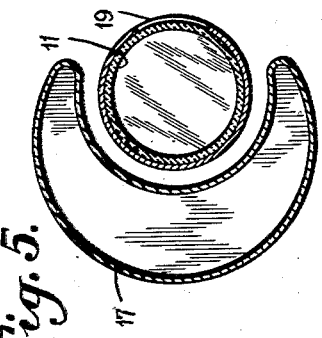
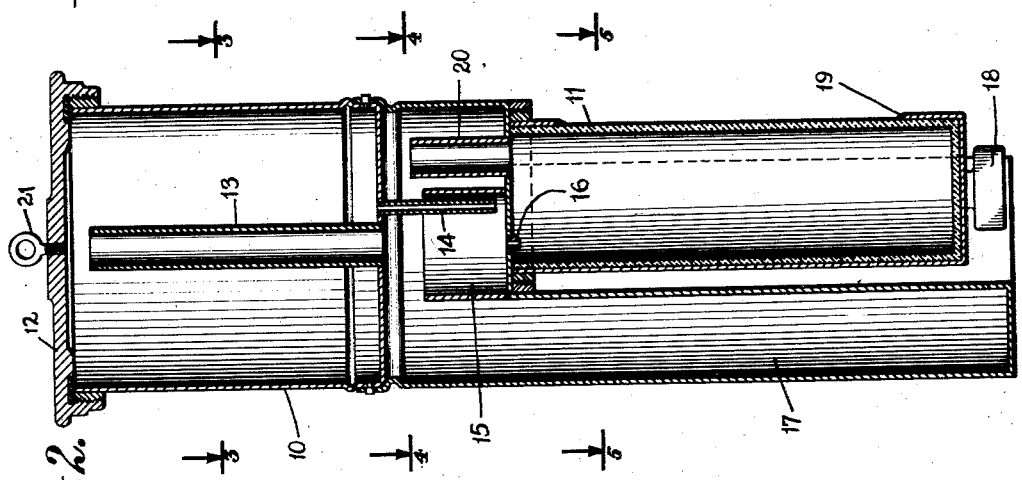
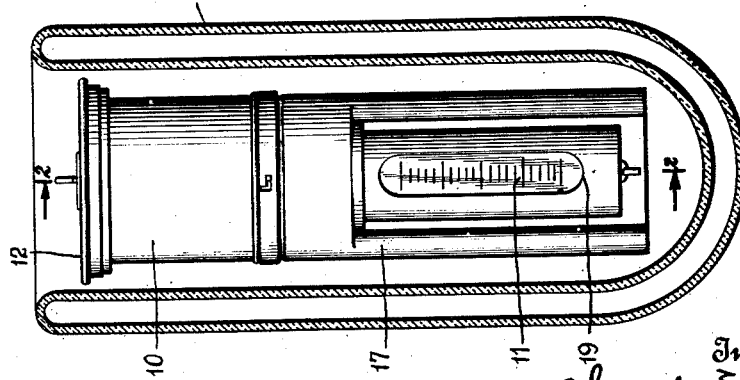
Inventor
Claude E. Emmons
By his Attorney Patented Jan. 17, 1928.

1,656,513

UNITED STATES PATENT OFFICE.

CLAUDE E. EMMONS, OF NEW YORK, N. Y., ASSIGNOR, BY MESNE ASSIGNMENTS, TO THE TEXAS COMPANY, OF NEW YORK, N. Y., A CORPORATION OF DELAWARE.

TESTING DEVICE.

Application filed October 11, 1924. Serial No. 742,972.

This invention relates to liquid testing devices and more particularly to such as are adapted for determining the viscosity of liquids such as oils or the like.

One object of the invention is to provide a simple, compact and durable testing device by means of which the comparative or relative viscosities of oils or other liquids may be determined.

Another object is to provide a portable testing device and one which can be easily and accurately operated by one not accustomed or skilled in the use of such instruments.

A further object is to provide a viscosity testor which can be sustained within a vacuum cylinder thereby insuring a definite temperature control.

Still another object is to provide a viscosity tester in which a constant head is maintained on the oil flowing into the receiving or measuring receptacle.

Other objects and advantages will appear as the description of the invention proceeds.

In the drawings.

Fig. 1 is a view in front elevation of a viscosity tester constructed in accordance with this invention and disposed within a vacuum cylinder which is shown in section.

Fig. 2 is a view of a central sectional elevation of the tester illustrated in Fig. 1.

Figs. 3, 4, and 5 are sectional plan views taken on the lines 3—3, 4—4, and 5—5, respectively, of Fig. 2.

By referring to the drawing and more particularly to Fig. 2 is will be seen that the device consists essentially of a receptacle or container 10 for holding a supply of the liquid to be tested, and a measuring or receiving receptacle or chamber 11 into which the liquid to be tested will flow.

More specifically the device comprises the upper supply container 10 which is adapted to contain the oil to be tested and which is provided with a removable top or cover 12 and a centrally disposed overflow pipe 13. The container 10 is also provided with a small discharge tube 14 which permits the oil being tested to flow into an open top or constant head container 15 which is positioned beneath the container 10. The constant head container 15 has a restricted orifice in its bottom which is provided with a nipple 16 through which oil is delivered into the glass lined receiving cylinder 11. The receiving cylinder 11 may be suitably graduated so that any fixed amount of oil may be determined or measured therein. The cylinder is screwed into position and is capable of being readily removed for purposes of cleaning and the lower end thereof is provided with a thumb screw 18 to assist in unscrewing the cylinder for removal.

The receiving chamber comprises an outer metal shell or protective casing and the inner glass cylinder which fits snugly within the metal shell, and a portion of the metal shell is cut away to form a port or window 19 through which the graduations on the inner glass receptacle, as well as the contents of the receptacle, are clearly visible. The receiving chamber is also provided at its upper end with a discharge pipe 20 for draining oil from the chamber when the device is in inverted position after a test has been completed, as will presently be described.

The device is provided with a detachable overflow chamber 17 to receive any waste or excess oil that may be delivered thereto through the overflow pipe 13 from the upper chamber 10, or from the constant head container 15 which feeds the efflux orifice or nipple 16. The upper portion of the overflow chamber is circular in cross section and provision is made for supporting the constant head container 15 and the discharge pipe 20 therein. The lower portion of the overflow chamber is substantially crescent shaped in cross section and practically surrounds the receiving chamber.

The top or cover 12 of the container 10 is provided with a downwardly projecting flange which is internally threaded to engage with corresponding threads on an annular collar which is suitably secured on the upper end of the supply container 10. A packing ring is disposed between the upper edge of the container and its annular collar and the top or cover 12 so that a tight seal between these parts can readily be effected. The cover is provided with a screw eye 21 which permits the device to be sustained or suspended within a vacuum or other cylinder 22 thereby insuring a definite temperature control.

The container 10 is supported above the overflow chamber 17 by means of an annular shoulder formed near the upper end of the overflow receptacle 17, and a pin joint serves to hold the two elements in fixed position with respect to each other.

The operation of the device is substantially as follows:—

The container 10 is filled with the oil to be tested and during the filling operation any excess oil will flow into the overflow pipe 13 from which it will empty into the overflow receptacle 17. The container 10 having been filled to the desired height, the top or cover 12 is screwed in place. The oil is discharged through the pipe 14 into the open top receptacle 15 which is filled to overflowing, the overflow therefrom emptying into the overflow chamber 17. The oil retained in the open top receptacle 15 is maintained under a constant head and is discharged through the restricted nipple 16 into the receiving cylinder 11. The rise of the liquid level in the receiving cylinder can be observed through the window 19 provided in the protective casing for that purpose and the time required to flow any desired quantity of oil into the receptacle can be readily observed. After a test has been completed the top or cover 12 is removed and the device inverted, the oil in the receiving cylinder then flowing therefrom through the discharge pipe 20 and, together with the oil collected in the overflow receptacle 17 is discharged through the overflow pipe 13 and into such receptacle as may be provided for the purpose.

A device of preferred form and construction has been illustrated and described for the purpose of showing a way in which this invention may be used, but the inventive thought upon which the application is based is broader than this illustrative embodiment thereof and no limitations are, therefore, intended other than those imposed by the appended claims.

What I claim is:

1. A unitary viscosity tester comprising a liquid supply container, a receiving receptacle in communication with the supply container and comprising an inner transparent cylinder and an outer protective casing formed with an opening through which graduations on the transparent cylinder are visible, and an overflow chamber substantially crescent shaped in cross-section and practically surrounding the receiving receptacle.

2. A unitary viscosity tester comprising a supply container having a discharge tube and an overflow pipe in the base thereof, an open top constant head container adapted to receive the liquid from the discharge tube and provided with a restricted orifice in the base thereof, a transparent receiving cylinder into which said orifice discharges the contents of the open top container, and an overflow chamber in which the excess liquid from both the supply container and the open top container is collected.

In witness whereof I have hereunto set my hand and seal this 6th day of October, 1924.

CLAUDE E. EMMONS.